(12) United States Patent
Callicoat et al.

(10) Patent No.: US 9,209,440 B2
(45) Date of Patent: Dec. 8, 2015

(54) HIGH VOLTAGE ACCESS PREVENTION

(75) Inventors: Debbi Callicoat, Livonia, MI (US); Philip Michael Gonzales, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 881 days.

(21) Appl. No.: 13/227,692

(22) Filed: Sep. 8, 2011

(65) Prior Publication Data

US 2013/0065108 A1 Mar. 14, 2013

(51) Int. Cl.
*H01M 2/10* (2006.01)
*H01M 2/20* (2006.01)
*H01R 11/28* (2006.01)
*H01M 2/34* (2006.01)

(52) U.S. Cl.
CPC .......... *H01M 2/1016* (2013.01); *H01M 2/1072* (2013.01); *H01M 2/1077* (2013.01); *H01M 2/202* (2013.01); *H01M 2/206* (2013.01); *H01M 2/34* (2013.01); *H01R 11/281* (2013.01); *H01R 11/282* (2013.01); *H01R 11/288* (2013.01); *Y10T 29/49947* (2015.01)

(58) Field of Classification Search
CPC ............ H01M 2/1016; H01M 2/1072; H01M 2/1077; H01M 2/202; H01M 2/206; H01R 11/281; H01R 11/282; H01R 11/288
See application file for complete search history.

(56) References Cited

U.S. PATENT DOCUMENTS

| 7,754,374 | B2 | 7/2010 | Hashida et al. |
| 2007/0054561 | A1 | 3/2007 | Gutman et al. |
| 2009/0155680 | A1 | 6/2009 | Maguire et al. |

*Primary Examiner* — Eugenia Wang
(74) *Attorney, Agent, or Firm* — Maristyn Law LLC; Lynda Kouroupis; David B. Kelley (57) ABSTRACT

Methods and apparatus for assembling a high voltage battery without exposing an operator to contacts having a voltage greater than a predetermined maximum are presented. A bus bar module has standard compartments equipped with integrated bus bars separated by break compartments without bus bars. The bus bar module can be coupled to a plurality of electrochemical cells to connect the cells in groups having a voltage less than a predetermined maximum Vmax. Compartment lids can be closed to prevent contact with connected posts. A separate non-integrated bus bar can be provided to a break compartment to connect a first group of cells with a second group of cells to form a series of connected cells that can provide a voltage greater than Vmax, to achieve a desired battery voltage. The bus bar module and methods of the invention can protect an operator during battery assembly or service.

20 Claims, 12 Drawing Sheets

HIGH VOLTAGE ACCESS PREVENTION

FIELD OF INVENTION

This invention relates to power storage devices, and more particularly to methods and apparatus for preventing high voltage exposure when assembling a multi-celled high voltage battery.

BACKGROUND

Power storage devices that employ electrochemical cells to convert chemical energy to electrical energy can provide power for a variety of applications. A plurality of cells can be electrically connected in series to provide a desired voltage between terminals. For example, a small hand-held battery, such as that commonly used in consumer electrical devices, may contain a small number of small cells that provide on the order of only a few volts, while larger batteries required for high-power applications may provide on the order of hundreds of volts. As an example, a battery deployed in a hybrid electric vehicle (HEV) electronic drive system can provide over 200V, and, depending on the size of the vehicle and its hybrid features, may require many small, medium or large electrochemical cells. Because a plurality of cells are connected in series to build up a desired voltage, there is a need for methods and systems that mitigate voltage exposure during high voltage battery assembly or servicing.

SUMMARY OF INVENTION

An example system of the invention can include a bus bar module having at least two standard compartments, each configured with an integrated bus bar to electrically connect adjacent cells, and at least one break compartment having no integrated bus bar, coupled to a plurality of electrochemical cells. Having no built-in bus bar, the break compartment can be configured to receive a separate non-integrated break bus bar. The bus bar module is configured to prevent exposure to a voltage greater than a predetermined maximum. For example, a system can include a bus bar module that prevents access to a high voltage, such as, but not limited to, a voltage greater than 50V. Upon coupling the bus bar module to one or more battery cell arrays, cells can be electrically connected by the integrated bus bars. Strategic positioning within the bus bar module of a break compartment, which does not include an integrated bus bar, can interrupt the accumulation of voltage over adjacent cells to prevent building a voltage greater than a predetermined maximum. For example, integrated bus bars can connect a group of cells to build up a voltage that does not surpass the predetermined maximum level. A break compartment can separate a first group of connected cells from a second group of connected cells, each group of cells having an accumulated voltage no greater than a predetermined maximum. Compartment lids can cover posts of electrically connected cells to prevent access to electrical contact points. A separate break bus bar can be inserted at a break compartment to connect groups of previously connected cells to form a series of connected cells that can provide a voltage greater than the predetermined maximum.

An example bus bar module can include a set of standard compartments, each having an integrated bus bar configured to electrically connect at least two battery cell posts received at the standard compartment. A bus bar module can further include at least one break compartment configured to receive a separate break bus bar to connect cell posts received at the break compartment. The break compartment can be disposed adjacent the set of standard compartments to prevent accumulation of a voltage greater than a predetermined threshold in battery cells connected by the standard compartment integrated bus bars. In an exemplary embodiment, a bus bar module includes a break compartment positioned between two sets of standard compartments. Break compartments and standard compartments can be equipped with lids that can be closed to conceal connected battery cell posts and prevent exposure to voltages higher than the predetermined maximum.

An example method of the invention can include: connecting adjacent electrochemical cells by one or more groups, wherein a voltage over an entire group is no greater than a predetermined maximum; covering the cell connections within a group; and connecting a first group of connected cells to a second group of connected cells to form a series of connected cells. A method can further include covering the connection of a first and second group of cells to prevent inadvertent contact. In an example embodiment, integrated bus bars of a bus bar module connect cells within a group, and a separate non-integrated break bus bar is provided to connect groups of connected cells. The connection of a first group of connected cells with a second group of connected cells can yield a voltage greater than the predetermined maximum over the combined cells. However, because voltage over the plurality of electrochemical cells is built up in a controlled manner, and contacts are covered to protect against inadvertent contact while building up the voltage, an operator is protected against exposure to a voltage greater than the predetermined maximum.

An example method of the invention can comprise providing a bus bar module to a plurality of electrochemical cells, the bus bar module having at least two standard compartments, each configured with an integrated bus bar, and having at least one break compartment having no integrated bus bar; closing the standard compartments; and providing a non-integral bus bar to the break compartment. An example method can further include closing the break compartment to cover the cell posts connected by the non-integral break bus bar.

DETAILED DESCRIPTION OF EXEMPLARY EMBODIMENTS

Example embodiments of the invention are presented herein; however, the invention may be embodied in a variety of alternative forms, as will be apparent to those skilled in the art. To facilitate understanding of the invention, and provide a basis for the claims, various figures are included in the specification. The figures may not be drawn to scale and related elements may be omitted so as to emphasize the novel features of the invention. Structural and functional details depicted in the figures are provided for the purpose of teaching the practice of the invention to those skilled in the art and are not to be interpreted as limitations. In addition, methods described in terms of a series of actions are not limited to the example sequence presented.

Figure 1:
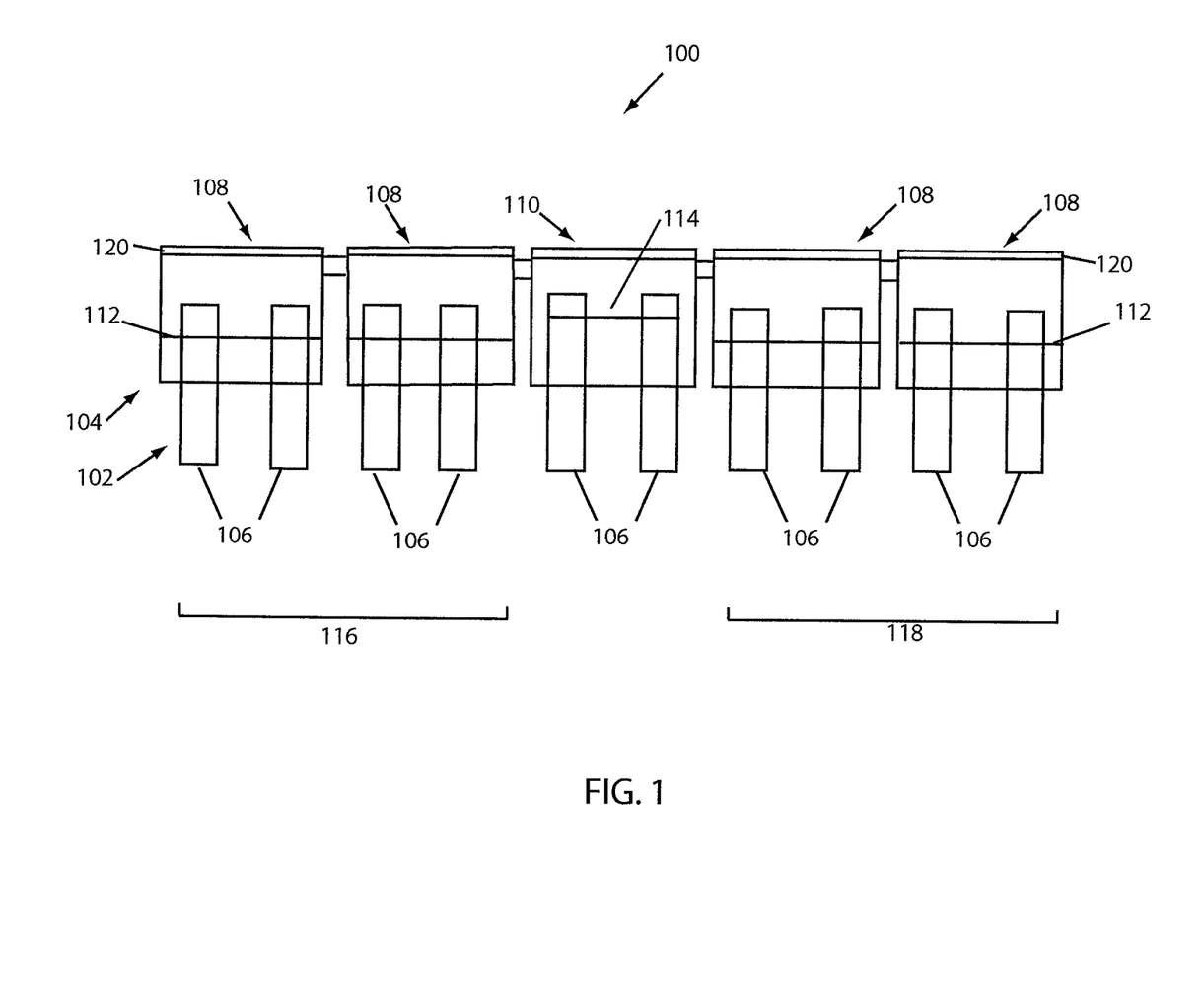
FIG. 1 shows an example system of the invention.

FIG. 1 shows a cross-sectional side view of an example system 100 that includes a cell array 102 in which a bus bar module 104 couples a plurality of electrochemical cells 106. The bus bar module 104 is configured to electrically connect the electrochemical cells 106 while protecting against human exposure to voltage levels greater than a predetermined threshold or maximum. For example, the bus bar module 104 can be configured to prevent access to voltage levels greater than 50V.

The bus bar module 104 comprises a plurality of standard compartments 108 separated by a break compartment 110. The standard compartments 108 are configured with an integrated bus bar 112, built in to the bus bar module 104, and configured to electrically connect the electrochemical cells 106. No bus bar is built in, or integrated with the break compartment 110. Instead, the break compartment 110 is configured to receive a separate, unique, non-integrated break bus bar 114. When the bus bar module 104 is coupled to the electrochemical cells 106, the integrated bus bars 112 can electrically connect adjacent cells 106 to build up voltage over the connected cells. The presence of the break compartment 110 interrupts the voltage build up, preventing it from exceeding a predetermined maximum threshold. For example, a voltage can build up over the cell group 116 by connection of the cells 106 within the group 116 by the integrated bus bars 112. The presence of the break compartment 110, having no bus bar, interrupts the accumulation of voltage, preventing it from exceeding the voltage built up over the group 116. Similarly, the cells 106 within the group 118 can be electrically connected by integrated bus bars 112 to build up a voltage over the four cells 106 within the group 118. The presence of the break compartment 114 interrupts the accumulation of voltage so that it doesn't exceed that which was built up over the four cells 106 within the group 118. The cells 106 interconnected within the groups 116 and 118 can be covered to prevent contact. In an example embodiment each standard compartment 108, and each break compartment 110 can comprise a lid 120 which can be closed down to cover the cells 106.

Figure 2A:
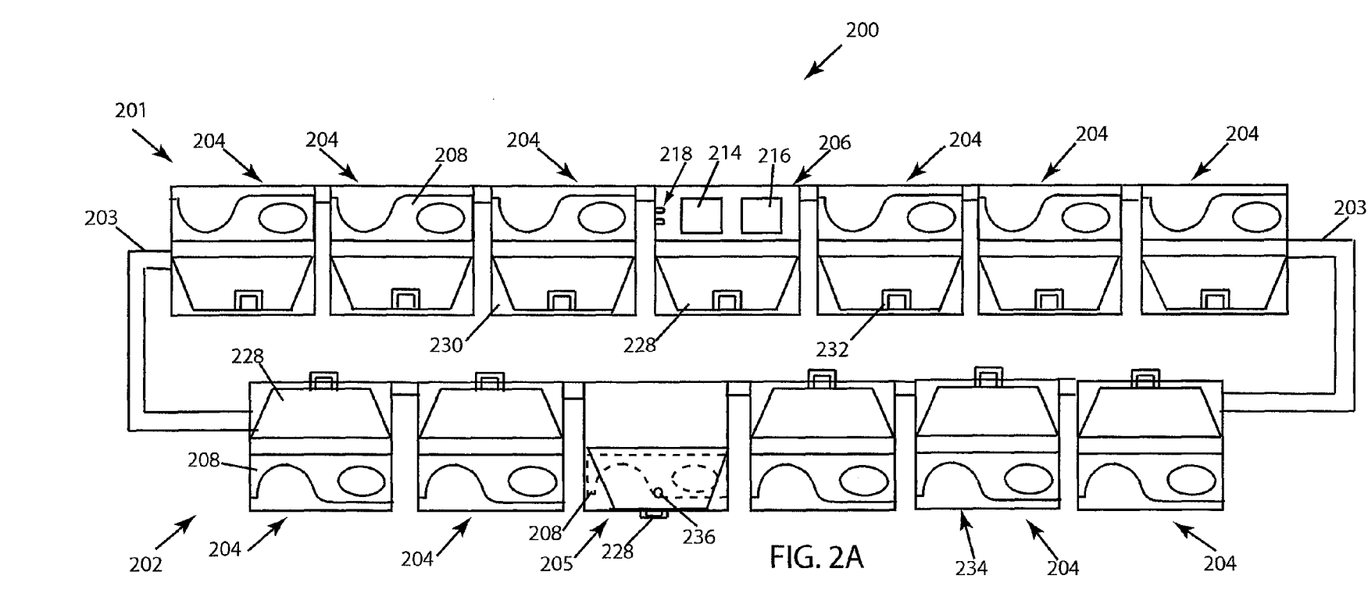
FIG. 2 shows an example bus bar module.
Figure 2B:
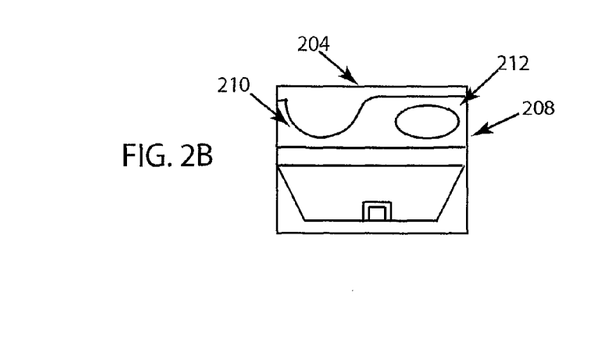

FIG. 2A shows a view looking down at a portion of an example bus bar module 200 configured to couple with an array of electrochemical cells (not shown). The bus bar module 200 comprises a first member 201 and a second member 202 which can be, but need not be, joined together by one or more coupler members 203. The bus bar module 200 comprises a plurality of standard compartments 204, and a break compartment 206. Each standard compartment 204 comprises an integrated bus bar 208 configured to electrically connect electrochemical cells to which it is coupled. As shown in FIG. 2B, the integrated bus bar 208 can comprise a conductor configured with a first contact portion 210 and a second contact portion 212, each configured for electrical contact with an electrode post of an electrochemical cell. For example, the integrated bus bar 208 can be in the form of a metal piece in which the first and/or second contact portions 210, 212 can include an aperture, such as the aperture 214, configured to receive an electrode post. In an example embodiment, the first and/or second contact portions 210, 212 can be configured to contact but not necessarily encircle a cell post. It will be understood by those skilled in the art that an integrated bus bar can be variably embodied to electrically connect two or more electrochemical cells within a bus bar module standard compartment. For example, an integrated bus bar can be laminated, can have symmetrical or asymmetrical contours and/or contact portions, and can be stiff or flexible. It is contemplated that high voltage cables can also be used to connect adjacent electrochemical cells.

The break compartment 206 is not configured with an integrated bus bar 208 since it is configured to receive a separate break bus bar. In an example embodiment, the break compartment 206 can be configured with a first receiving portion 214 for receiving a post of a first battery cell, and a second receiving portion 216 for receiving a post of a second battery cell, so that when the bus bar module 200 is coupled to a cell array, posts of adjoining cells can protrude through the first and second receiving portions 214, 216. The break compartment 206 can be configured to receive a break bus bar, and accordingly can be configured with an alignment portion 218 to facilitate break bus bar insertion by an operator. The alignment portion 218 can be variously embodied. By way of example and not limitation, the alignment portion 218 can include a ridge or one or more protrusions along a compartment sidewall that can function as a track for guiding insertion of a break bus bar. As a further example, an alignment portion can be configured with a lip for catching and/or securing a break bus bar.

Figure 2C:
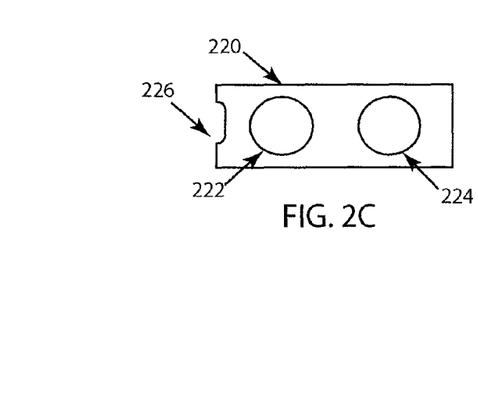

FIG. 2C shows an example break bus bar 220 configured with a first aperture 222 and a second aperture 224 for receiving first and second battery cell terminal posts. Because it is configured for operator insertion into the break compartment 206 of the bus bar module 200, the break bus bar 220 can be configured with a notched portion 226 configured to cooperate with an alignment portion 218 of the break compartment 206 to facilitate insertion by an operator.

The standard 204 and break 206 compartments can be configured with a lid 228 that can be moved from an open position (shown by the open compartments 204, and break compartment 206) to a closed position (shown by closed standard compartment 205) to cover battery posts and the bus bar within the bus bar module compartments, shielding the cell posts and preventing inadvertent contact by an operator. In an example embodiment, standard and break compartments can be configured with the lid 228, configured to cover two battery posts. However, a bus bar module can be configured with a compartment lid configured to cover more than 2 posts. For example, it may be necessary to cover cells of adjoining arrays by a larger lid that can span across the distance between arrays or cover more than two cell posts. Alternatively, as described later herein, an auxiliary lid can be provided to cover more than two posts. In an exemplary embodiment, a standard compartment 204 and a break compartment 206 can include a top portion 230 which provides a surface upon which the lid 228 can rest when in an open position. The lid 228 can be hingedly coupled to the top portion 230. The lid 228 can include a coupling means 232 for securing it in a closed position. For example, the coupling means 232 can be in the form of a catch configured to couple with a compartment sidewall 234. In addition, the coupling means 232 can be used as a handle by which an operator can grasp the lid 228 to move it from an open to a closed position. A knob 236 can be disposed at the lid 228 to facilitate its lifting by an operator to move it from a closed to an open position, and can be in the form of a protrusion extending from the lid 228. Although not depicted in FIG. 2, the top portion 230 can include a coupling means for cooperating with the knob 236 to secure the lid 228 in an open position.

In an exemplary embodiment, the compartment sidewall 234 of a standard compartment and a break compartment can be high relative to a received cell, so that cell posts and bus bars are recessed within the bus bar module, further protecting an operator against inadvertent exposure to contact points during an assembly process.

Figure 3A:
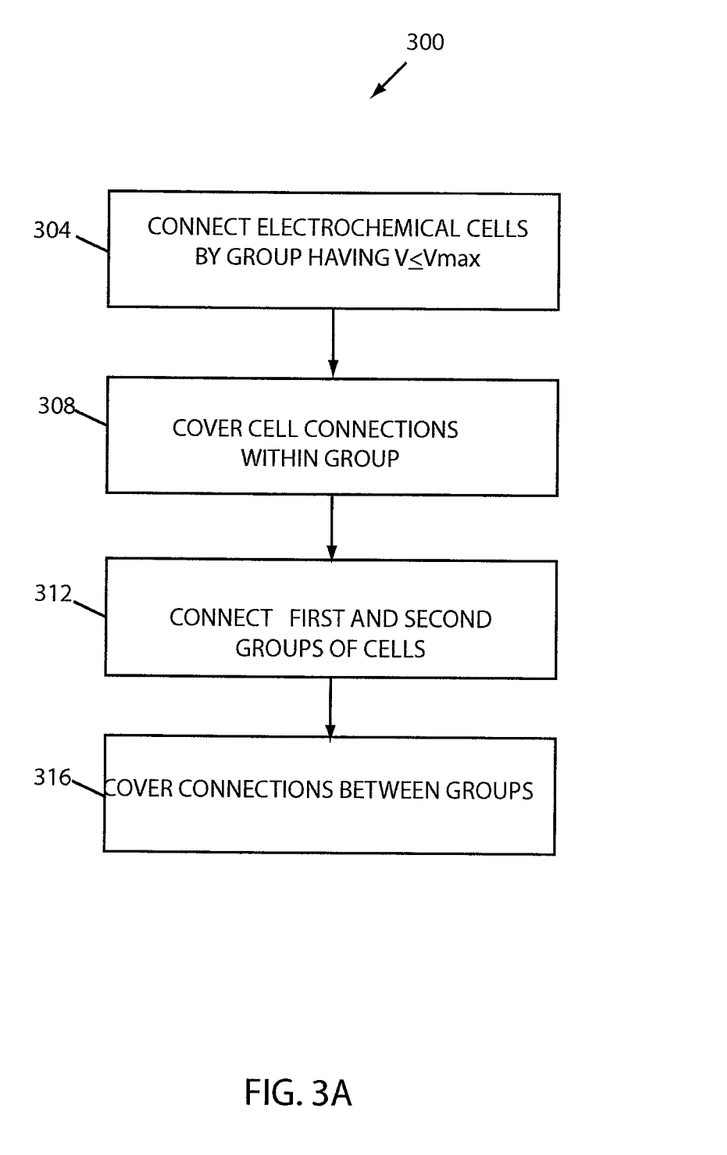
FIG. 3A shows an example method.
Figure 3B:
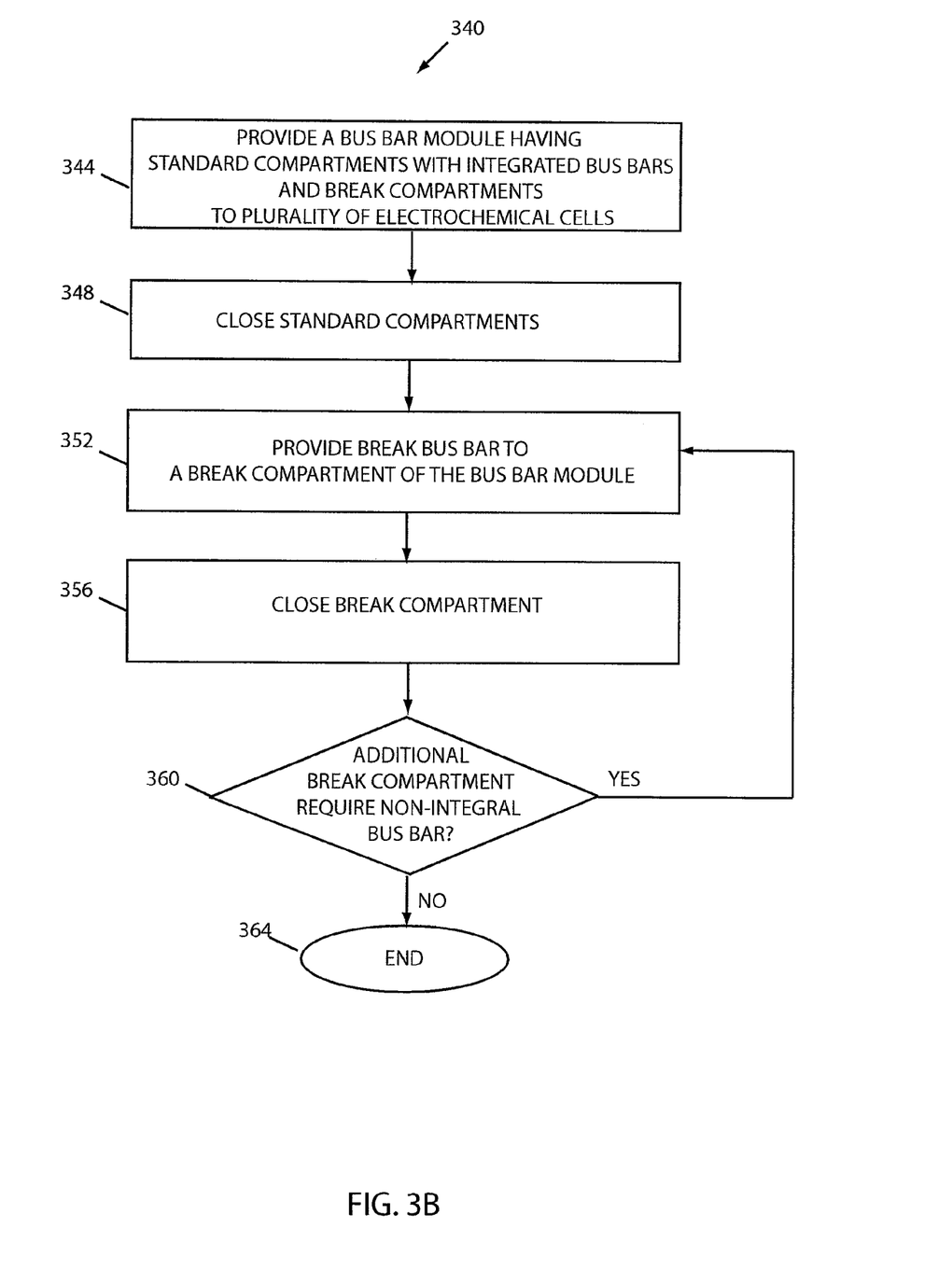
FIG. 3B shows an example method.

FIG. 3A presents a flow diagram of an example method 300 of the invention. At block 304, a group of electrochemical cells can be connected to provide a voltage no greater than a predetermined maximum voltage Vmax over the group. Referring to FIG. 3B, which shows a flow diagram of an example method 340 of the invention that can be practiced to implement the method 300, at block 344, a bus bar module having standard compartments with integrated bus bars can be provided to connect a group of electrochemical cells. For example, a bus bar module having standard compartments 204 with integrated bus bars 208 and strategically placed break compartments 206 can be provided to a set of electrochemical cells.

Figure 4:
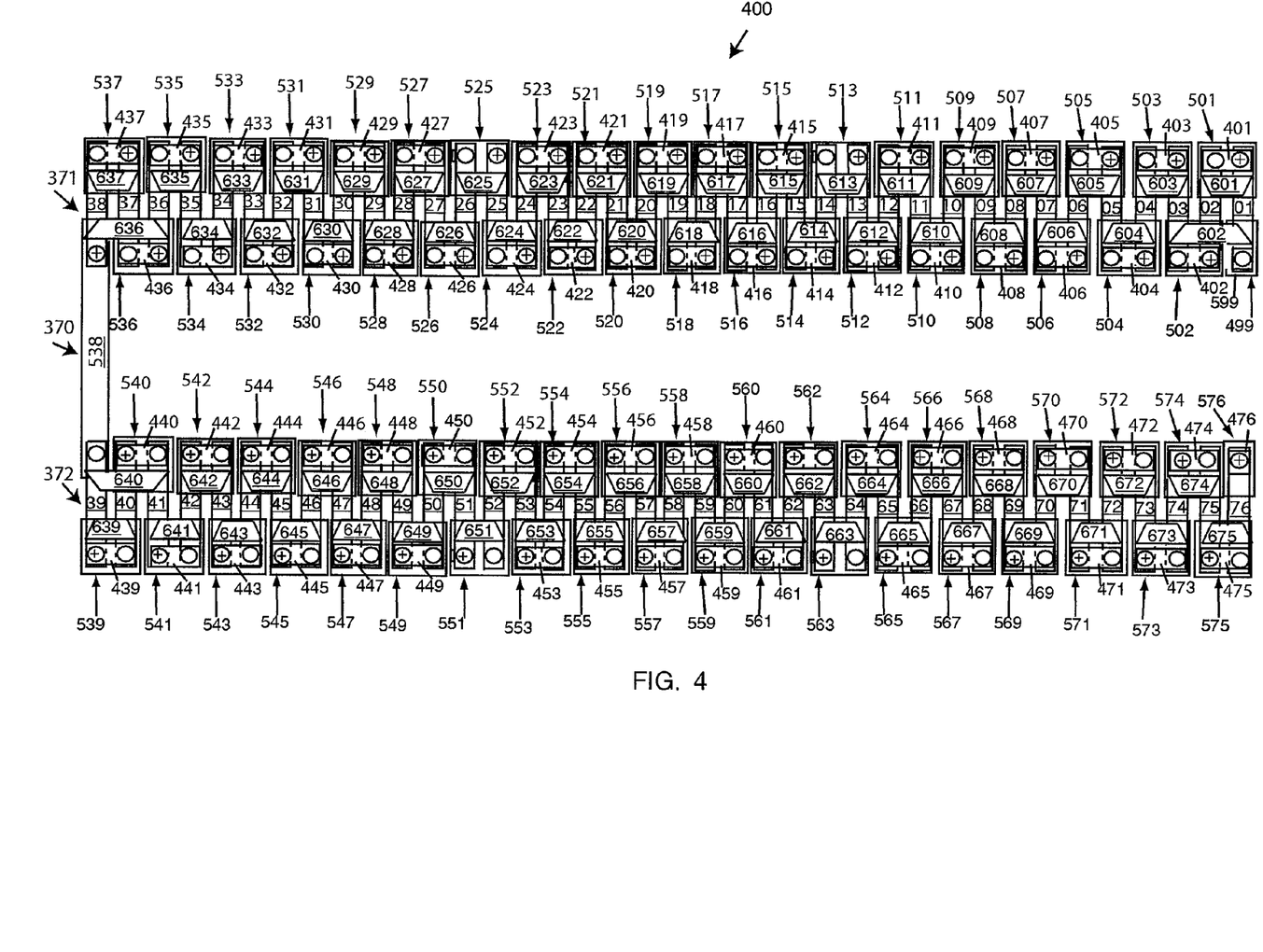
FIG. 4 shows an example system comprising a bus bar module and two multi-cell arrays.

FIG. 4A shows an example system 400 in which a bus bar module 370 is provided to first and second arrays, 371, 372 of battery cells to provide electrical connectivity between cells. Some structural aspects of the bus bar module 370 are not shown in order to better emphasize the manner in which integrated bus bars are employed to provide electrical connectivity between cells. Electrochemical cells are identified as cells 01-76. In the exemplary embodiment 400, the electrochemical cells are arranged in the first array 371 and the second array 372 so that adjacent cell posts are of opposing polarity.

Integrated bus bars are identified by reference numerals 401-412, 414-424, 426-437, 439-450, 452-462, 464-476, and 499 (associated with the negative post of cell 01), to correlate with their positions in relation to the electrochemical cells 01-76. Standard compartments are identified by reference numerals 501-512, 514-524, 526-537, 599 (associated with the negative post of cell 01) to indicate and correlate with their association with particular cells and bus bars. Break compartments are numbered 513, 525, 538, 551 and 563 to indicate and correlate with their positions in relation to particular cells. Compartment lids are identified by reference numerals 601-675, to indicate association with particular compartments. Each cell has a positive post indicated by a "+" in a circle, and a negative post indicated by a blank, empty circle.

In an exemplary embodiment, connecting a group of cells comprises coupling the bus bar module 370 to the cell arrays 371, 372 so that an integrated bus bar in a standard compartment connects a positive post of a first cell with a negative post of an adjacent cell. In an example embodiment, the bus bar module 370 can comprise a first plastic member containing the odd compartments 501-537, and a second plastic member providing the even compartments 502-538 for the array 371. Similarly, the bus bar module 370 can include a first plastic member containing the even bus bars 440-476, and a second member containing the odd bus bars 39-75 for the second array 372. In an exemplary embodiment, a bus bar module can comprise non-conducting, non-flammable plastic of sufficient rigidity.

Figure 5:
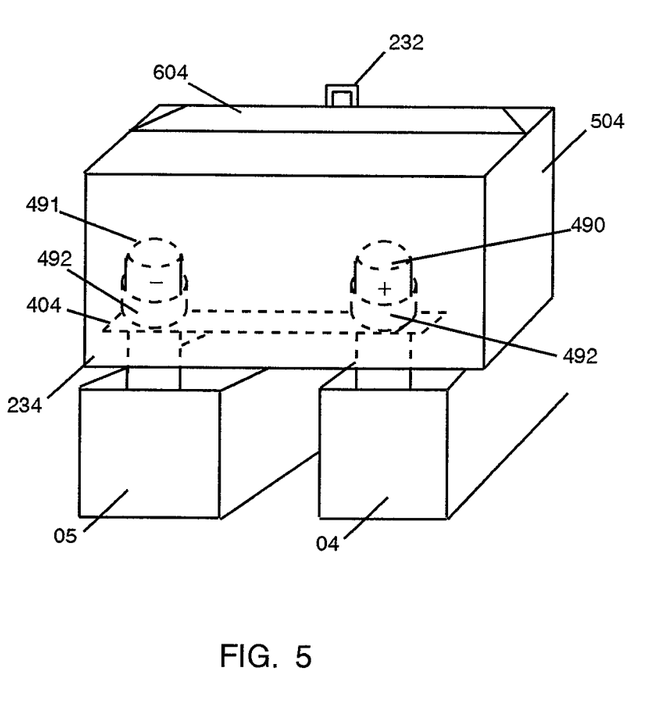
FIG. 5 shows an example system comprising a bus bar module and two multi-cell arrays.

By way of example, the integrated bus bar 401 can connect the positive post of cell 01 with the negative post of cell number 02. The integrated bus bar 402 can connect the positive post of cell 02 with the negative post of cell 03, and so forth down the array 371 so that a voltage can build over the coupled cells, to the point at which integrated bus bar 412 connects the positive post of cell 12 with the negative post of cell 13. In an exemplary embodiment, a nut 492 can be screwed over a cell post to secure an integrated bus bar. Referring to FIG. 5, the integrated bus bar 404 connects the positive post 490 of cell 04 with the negative post 491 of cell 05, and is secured by the nuts 492.

The bus bars 401-412 can electrically connect a first group of cells, cells 1-13, so that a voltage accumulates between a contact point on cell 1 and a contact point on cell 13. In an exemplary embodiment, the number of adjacent cells connected in a group can be such that a predetermined maximum voltage, Vmax, is not exceeded. By way of example, but not limitation, a maximum voltage of 50V can be designated as Vmax, to safeguard an operator against high voltage exposure. Federal regulations FMVSS-305 define high voltage as 60V DC/30V AC. Accordingly, the number of cells connected in a group can be configured so that the voltage accumulated over the cells does not exceed 60V, for example, a maximum of 50V can be designated. In an example embodiment, at the point where connection with an additional cell would exceed the 50V maximum, a break compartment can be positioned that interrupts the build up of voltage. Thus, with the cells 1-13 connected as shown in FIG. 4, the voltage between the positive post of cell 1 and the negative post of cell 13, or any two posts there between, does not exceed the predetermined maximum 50V. Furthermore, the remaining cells 13-76 can be separated by the break compartments 525, 538, 551 and 563, to prevent accumulation of voltage greater than the predetermined maximum, so that the voltage between cells 14-25, 26-39, 40-52, 53-64, 65-77, and any two posts therebetween, is no greater than a predetermined voltage Vmax, such as 50V. Thus, by limiting the number and voltage of the cells connected by integrated bus bars, an operator can be protected against contact with a high voltage, or a voltage greater than the predetermined maximum.

In an exemplary embodiment, coupling a bus bar module to the cell arrays 370, 371 can provide integrated bus bars 401-412 to connect a first group of cells 1-13, integrated bus bars 414-424 to connect a second group comprising cells 14-25, integrated bus bars 426-437 to connect a third group including cells 27-39, integrated bus bars 439-450 to connect a fourth group comprising cells 40-52, integrated bus bars 452-462 to connect a fifth group including cells 53-64, and integrated bus bars 464-475 to connect a sixth group including cells 65-76. In an example method, the nut 492 can be screwed over each post connected by an integrated bus bar. In an exemplary embodiment, nuts are applied by group, so that a first group of bus bars, such as bus bars 401-413 are secured with nuts 492, then a second group of bus bars, 414-424 is secured, and so forth.

Referring back to FIG. 3, at block 308, the cell connections can be covered. In an exemplary embodiment, as shown by block 348 of FIG. 3B, connections can be covered by closing the standard compartments. In an example embodiment, compartments connecting a first group of adjacent cells can be closed. Preferably, integrated bus bars in the standard compartments associated with the first group of cells are secured with nuts prior to closing the lids of the standard compartments.

Figure 6A:
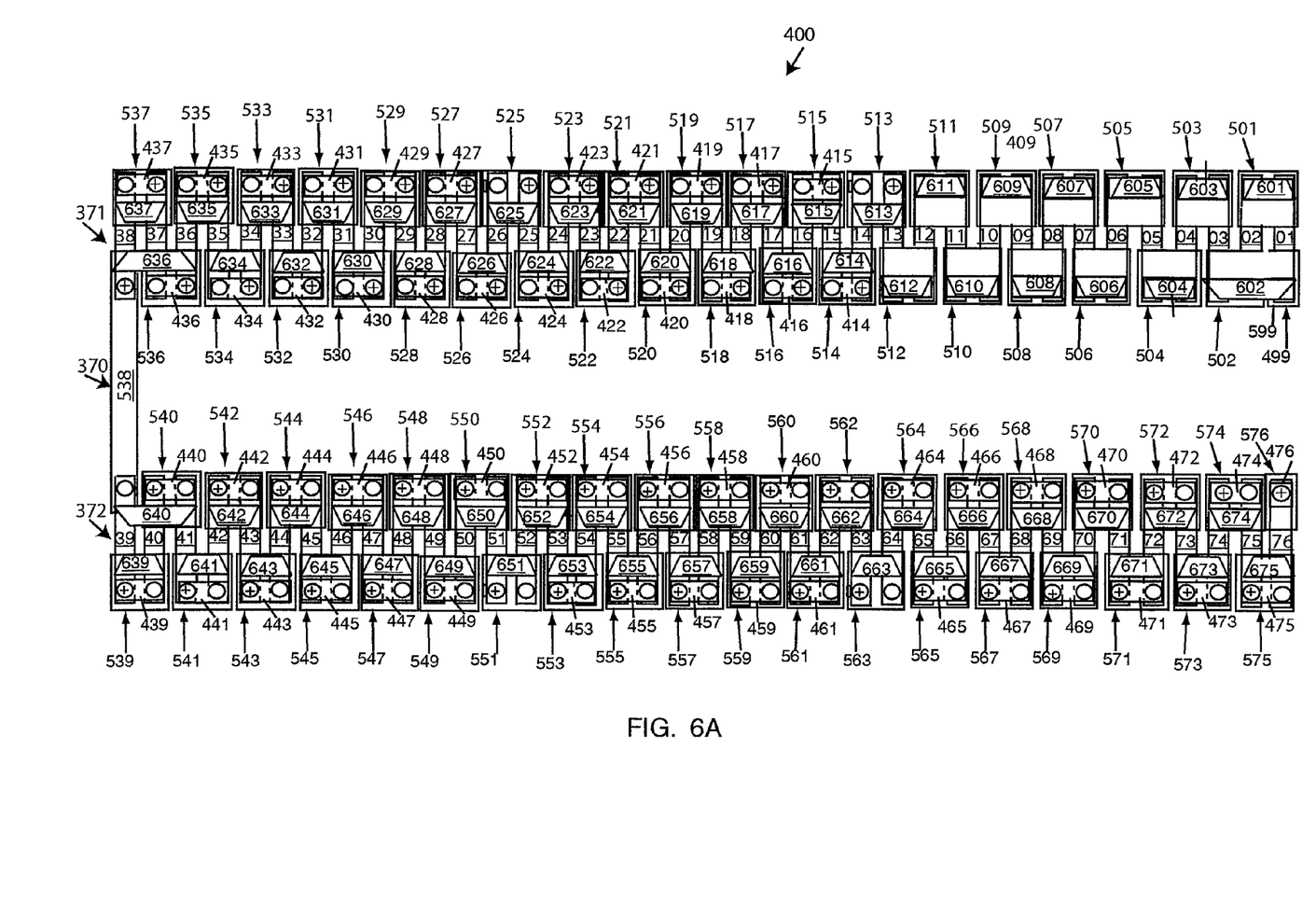
FIG. 6A shows an example system comprising a bus bar module and two multi-cell arrays.

By way of example, as depicted in FIGS. 5 and 6A, the lids 601-612, associated with compartments 501-512 for the group of cells 01-13 can be lifted from an open position, providing access to positive and negative posts, to a closed position covering the posts, thereby preventing operator contact. In an example embodiment, while connected cells 01-13 can be covered, the positive post of cell 13 can be left uncovered since it is in a break compartment and is not connected to an adjacent cell.

Figure 6B:
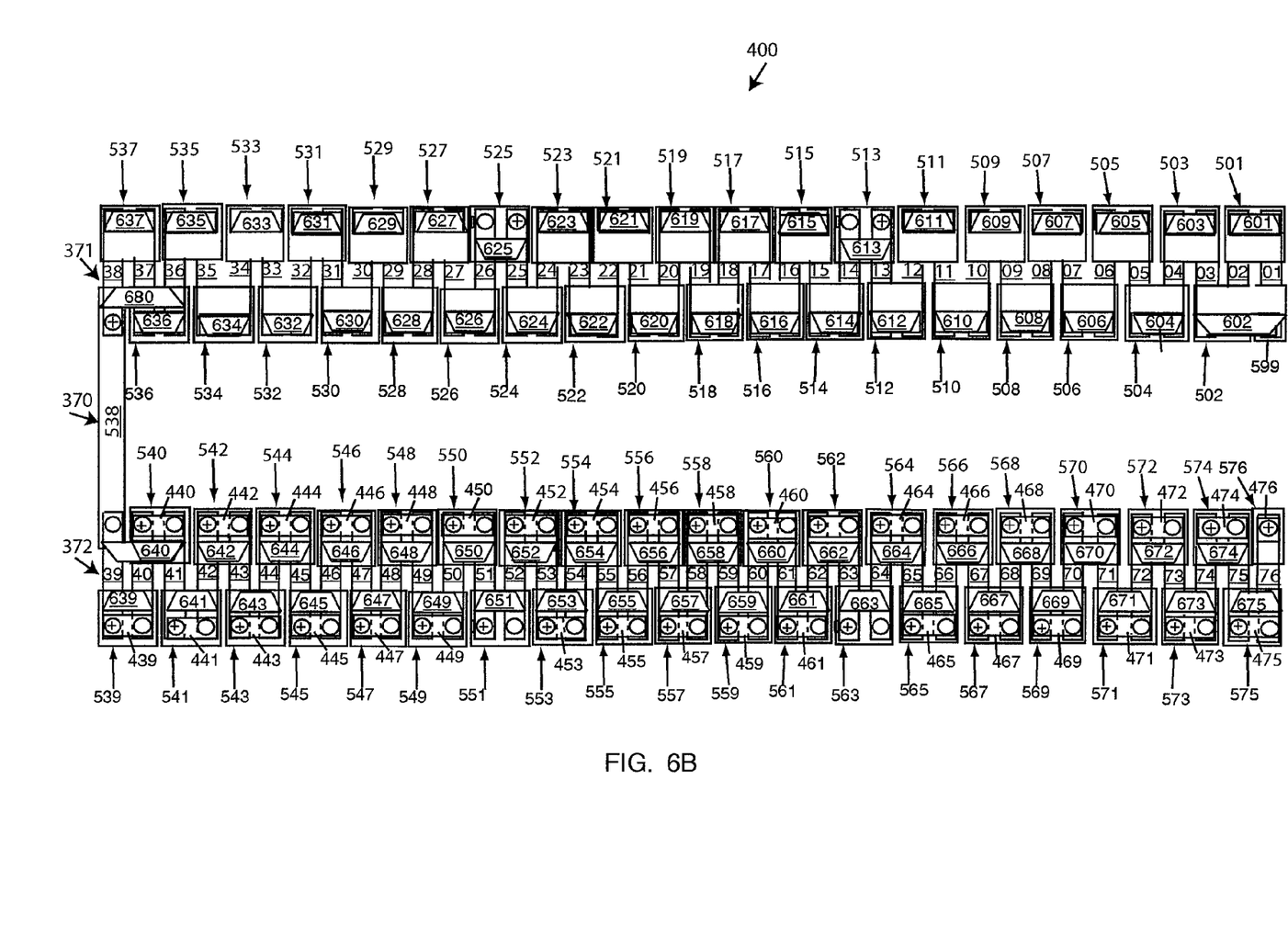
FIG. 6B shows an example system comprising a bus bar module and two multi-cell arrays.

Upon covering the connections within a first group by closing a first set of standard compartments, a determination can be made as to whether additional standard compartments remain open. If so, the securing and covering process can continue with the closing of a further set of compartments associated with a second group of connected cells. For example, after compartment lids 601-612 are closed, the compartment lids 614-624 can be closed. The process of applying nuts and covering connections can continue with the closing of the lids 626-637 so that the first array 371, as shown in FIG. 6B, has all posts that are connected by integrated bus bars covered to prevent contact by an operator. When the compartment lid 636 is closed, the positive post of cell 38, shown here in the break compartment 538 can remain exposed.

Figure 6C:
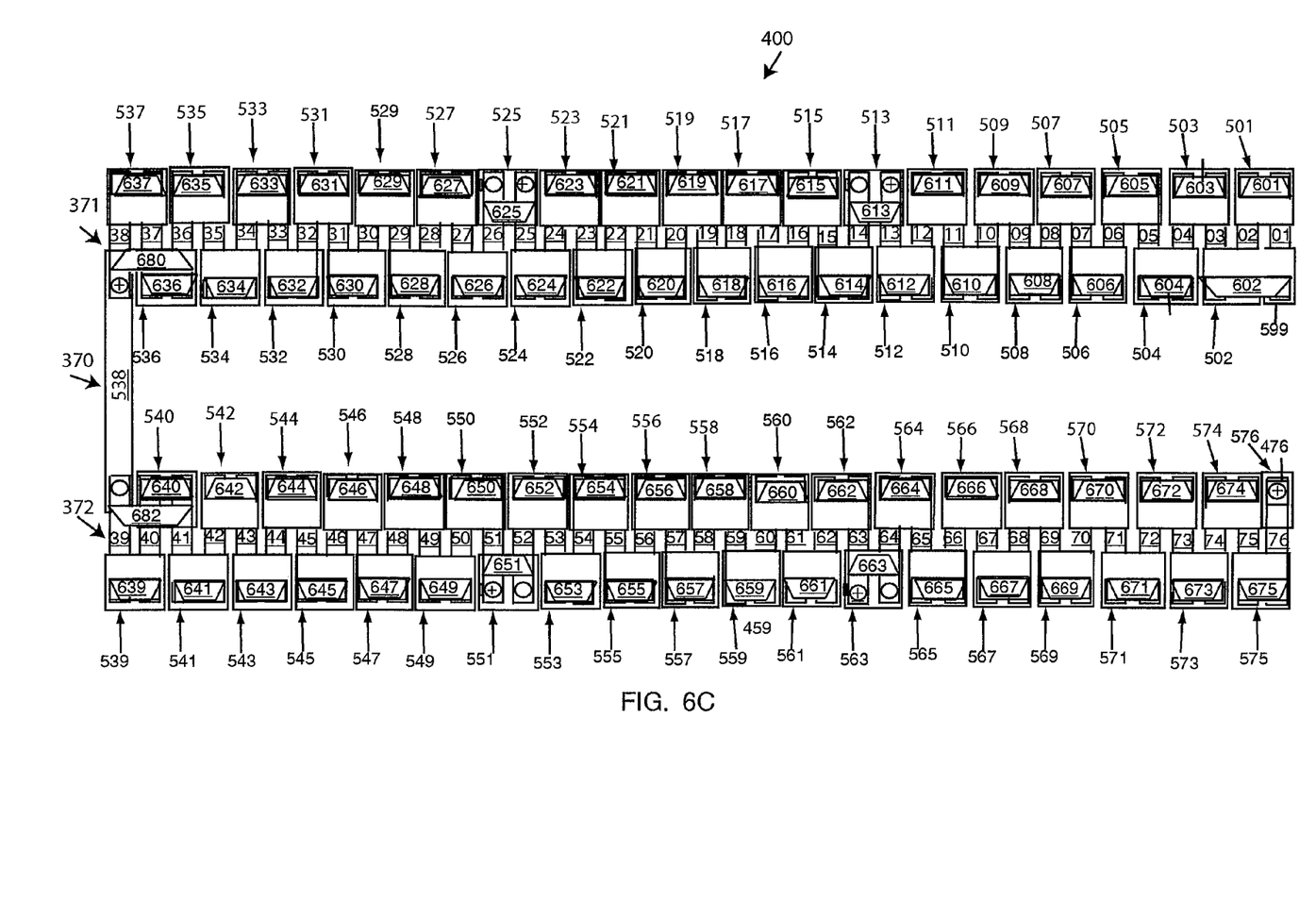
FIG. 6C shows an example system comprising a bus bar module and two multi-cell arrays.
Figure 6D:
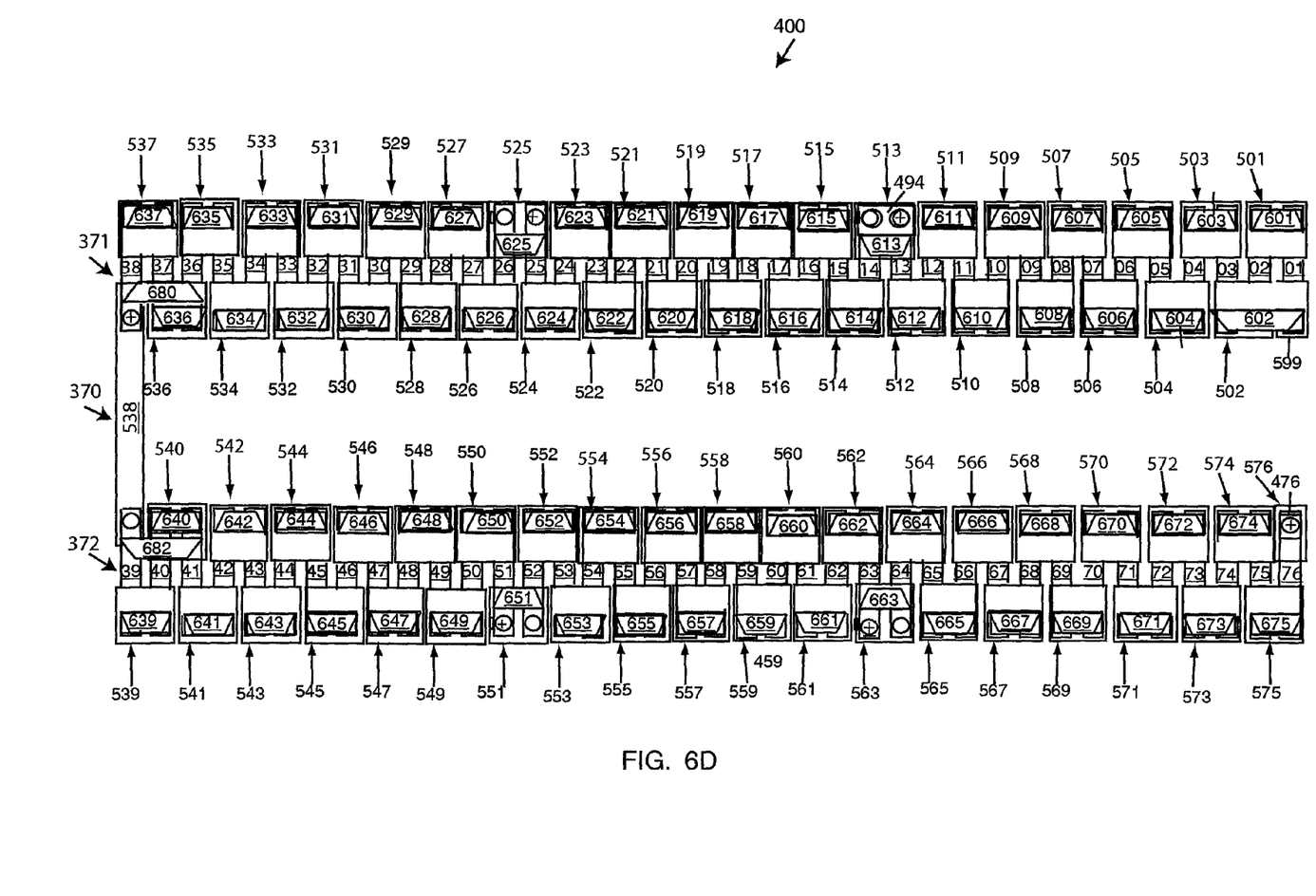
FIG. 6D shows an example system comprising a bus bar module and two multi-cell arrays.

The process of applying nuts to, and closing covers over, groups of connected cells can continue until all groups of cells connected by integrated bus bars in both arrays 370, 371 are covered, as shown in FIG. 6C. Once all the integrated bus bar connections are covered, the only remaining posts exposed are those at the break compartments 513, 525, 538, 551, and 563. As discussed previously herein, since the voltage that builds up over a group of cells interconnected by integrated bus bars is limited to a predetermined maximum by the presence of break compartments, contact with any two exposed posts subjects an operator to a voltage that does not exceed the predetermined maximum. For example, contact with the positive post of cell 13 at compartment 513, and the negative post of cell 26 of compartment 525, will result in contact with zero voltage since the posts are at the same potential when there are no break bus bars in the break compartments. Contact with the negative post of cell 14 and the positive post of cell 25 will expose an operator to a voltage less than the predetermined maximum. Contact with any of the unconnected posts exposed at the break compartments 538, 551 or 563 will not expose an operator to a voltage higher than the predetermined maximum. Thus, an operator is protected against high voltage exposure.

Referring back to FIG. 3 and continuing the method 300, at block 312 a first group of connected cells can be connected to a second group of connected cells to form a series of connected cells. As shown by block 352 of the method 340, a break bus bar can be provided to a break compartment to connect a first group of connected cells to a second group of connected cells. For example, the break bus bar 494 can be provided to the break compartment 513 to connect the positive post of cell 13 with the negative post of cell 14. By doing so, the group of connected cells 01-13 is connected with the group of connected cells 13-24. Nuts 492 (not shown) can be used to secure the break bus bar 494 at the break compartment 513. As discussed earlier herein, the positive post of cell 13 and the negative post of cell 14 are at the same potential, so securing the break bus bar 494 at the break compartment 513 does not pose a risk of high voltage injury to an operator.

Figure 6E:
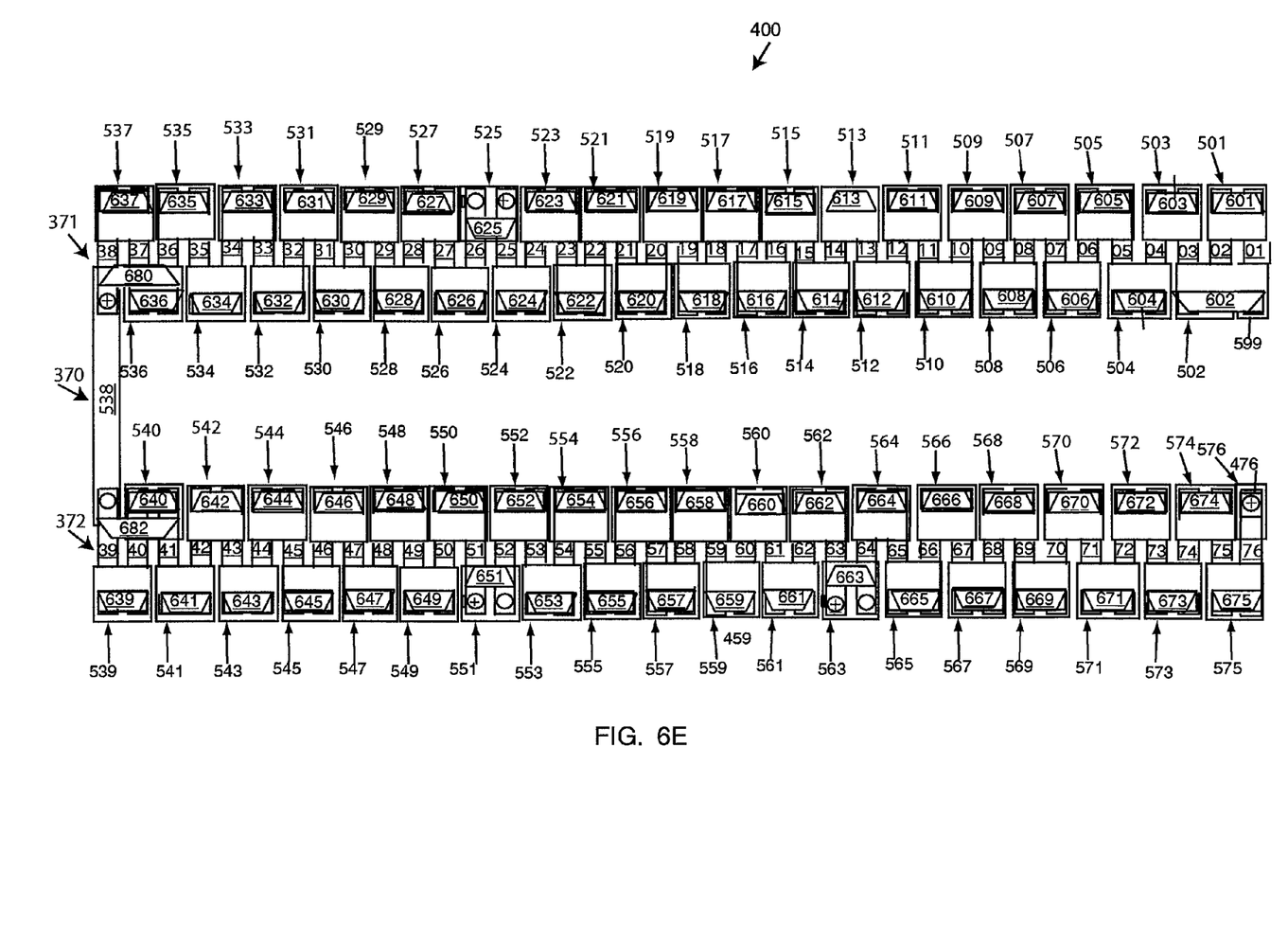
FIG. 6E shows an example system comprising a bus bar module and two multi-cell arrays.
Figure 6F:
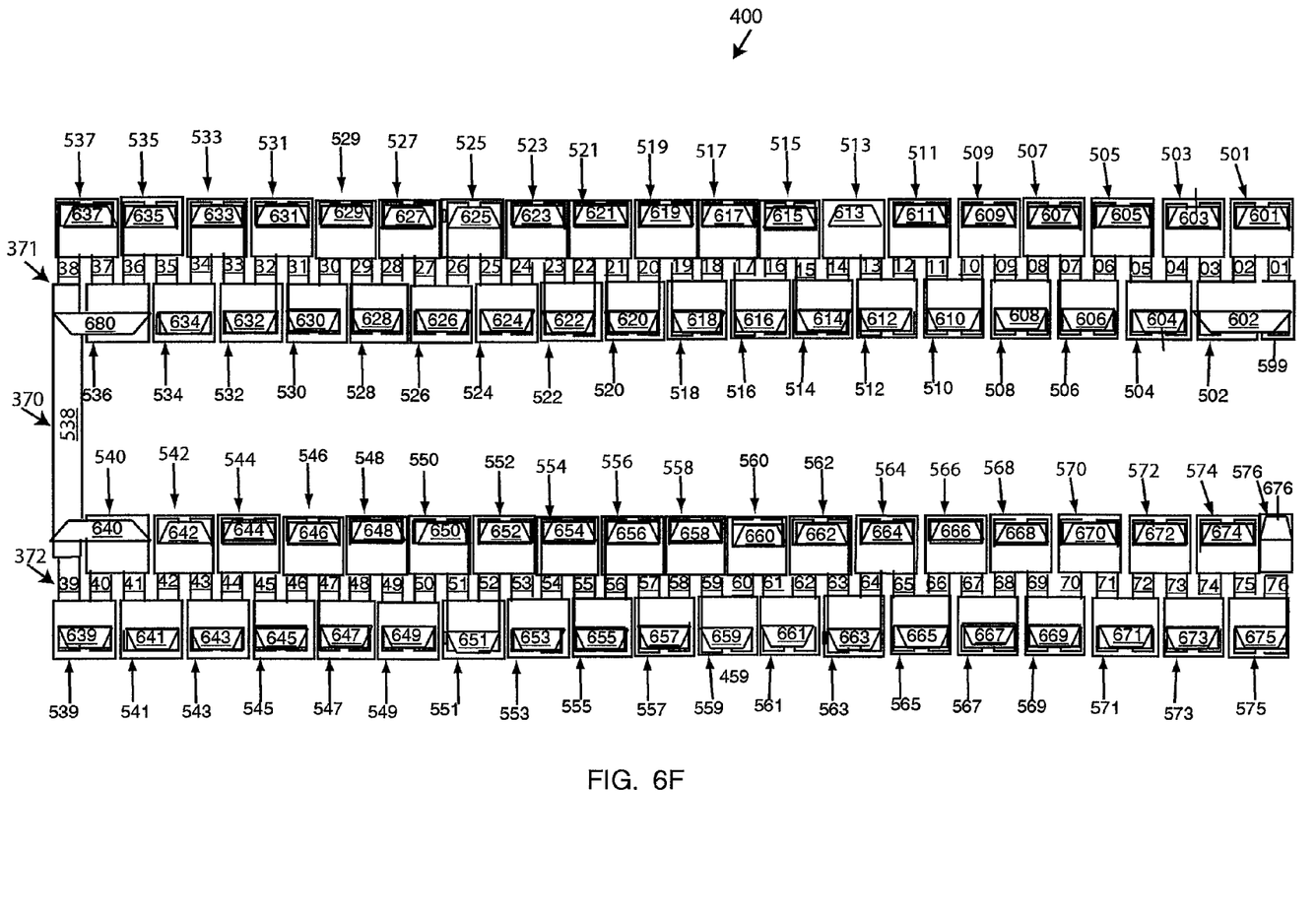
FIG. 6F shows an example system comprising a bus bar module and two multi-cell arrays.

At block 316, a connection between groups of connected cells can be covered. By way of example, method 340 provides an example implementation at blocks 356-360. At block 360, a compartment lid can be closed to cover a break compartment in which a break bus bar has been received. For example, the compartment lid 613 associated with the break compartment 513 can be moved from an open position to a closed position to cover the positive post of cell 13 and the negative post of cell 14 connected by the break bus bar 494, as shown in FIG. 6E.

At block 360, a determination can be made as to whether there are remaining break compartments that require break bus bars. Referring to FIG. 6E, it can be seen that there are several break compartments, namely 525, 538, 551 and 563 that remain without a break bus bar. In an exemplary embodiment, the cell groups in each array are connected, and subsequently the two arrays are connected. For example, after a break bus bar is provided to the break compartment 513, and the lid 613 closed, the method 340 can continue at block 352, and the break bus bar 494 can be provided to the break compartment 525, electrically coupling the cells 01-25 with the cells 26-38, completing connection of the first array 371. Because there is no difference in potential between the positive post of cell 25 and the negative post of cell 26 at the break compartment 525, the voltage is not greater than the predetermined maximum, an operator is not exposed to high voltage when securing a break bus bar at the break compartment 525. In addition, as stated previously herein, operator contact with any exposed positive post and exposed negative post would result in contact with a voltage no greater than the predetermined maximum Vmax, for example 50V, protecting an operator from high voltage exposure. At block 356, the lid 625 of the break compartment 525 can be closed to cover the cell 25 positive post and the cell 26 negative post connected by the break bus bar 220. With the connection of the cells 01-38 of the first array 371, a voltage of around 100V can be built up without posing a hazardous risk to an operator.

The blocks 352-360 can be repeated with respect to the second array 372 with the insertion of a break bus bar in the break compartment 563 to form a connected series of cells including the positive post of cell 52 through cell 76, followed by the closing of the lid 663. Because the positive post of cell 63 and the negative post of cell 64 are at the same potential, there is no risk of high voltage exposure to an operator securing a break bus bar at the break compartment 563. The closing of the lid 663 covers the inserted break bus bar connections. After providing a break bus bar to compartment 563, a break bus bar can be provided to the break compartment 551 to connect the connected cells 39-51 with the connected cells 52-76. At this point the only exposed posts are at the break compartment 538 and the break compartment 551. The difference in potential between a post at the break compartment 538 and a post at the break compartment 551 is no more than the predetermined maximum. The positive post of cell 51 and the negative post of cell 52 are at the same potential, so the operator is shielded from high voltage exposure when providing a break bus bar to the break compartment 551. With the closing of the lid 651, all cell groups of the array 372 are connected. At this point, the blocks 352-360 can be repeated with respect to the break compartment 538 so that a break bus bar is provided to connect the first array 371 to the second array 372. Since all other bus bars and break bus bars are covered, and the positive post of cell 38 and the negative post of cell 39 are at the same potential, there is no risk of accidental high voltage exposure to an operator securing a break bus bar at the break compartment 538. At block 356, the positive post of cell 38 and the negative post of cell 39 connected by a break bus bar can be covered by closing a compartment lid.

The bus bar module 370 can include one or more lids configured for covering more than two posts. For example, the lid 602 can be configured to cover three posts: the negative post of cell 01, the positive post of cell 02, and the negative post of cell 03, even though only the cell 02 and cell 03 posts are connected by the integrated bus bar 402. The bus bar module 370 can be configured with an auxiliary lid 680 configured to cover the compartment 536, in which the integrated bus bar 436 is covered by lid 636, as well as the positive post of cell 38. In similar fashion, an auxiliary lid 682 can be configured to cover the compartment 540, in which the integrated bus bar 440 is covered by the lid 640, as well as the negative post of the cell 39. In the exemplary embodiment 400, a break compartment 538 is configured to receive a break bus bar for connecting the cell 38 positive post and the cell 39 negative post. In such a configuration, the compartment itself may be configured with a lid to cover posts received therein, eliminating the need for the auxiliary lids 680, 682. However, it is contemplated that a bus bar module may be configured to allow connection of the two arrays via a break bus bar without a dedicated compartment and/or lid.

When no additional break compartments require a break bus bar and all break bus bar connections have been covered, the method 340 can conclude at block 364. Upon termination of the method, a high voltage battery will have been assembled having a voltage greater than the predetermined maximum without having exposed an operator to a high voltage during the assembly process.

The example methods and apparatus described herein can be used to manufacture or service a high voltage battery while protecting an operator against high voltage exposure. For example, should a battery require servicing, compartment lids can be opened, and cells disconnected in a manner that protects an operator against exposure to a voltage greater than a predetermined maximum. An example method for disconnecting cells of a high voltage battery can include lifting the compartment lid 680 to expose the positive post of cell 38, and lifting the compartment lid 82 to expose the negative post of cell 39, then removing the non-integral bus bar that connects those two posts, thereby disconnecting the first and second arrays 371, 372. Because these two posts are at the same potential, and all other posts are covered, an operator will not be at risk for voltage exposure greater than the predetermined maximum. Having separated the cells of the first array 371 from the second array 372, an operator can then proceed to remove the non-integral bus bars from the break compartments of the individual arrays. For example, the cover 651 can be lifted for removal of the non-integral bus bar at the compartment 551, and the cover 663 can be lifted for the removal of the non-integral bus bar at the break compartment 563. A similar process can be performed for the array 371, with removal of the non-integral bus bar at compartment 525 and 513.

Thus, a high voltage battery can be assembled or serviced without exposing an operator to voltage levels higher than a predetermined maximum. A bus bar module can be configured with standard compartments having built-in bus bars, and break compartments configured to receive separate bus bars. While built-in, or integrated bus bars, connect adjacent cells in series to build up a voltage, the presence of break compartments can interrupt the accumulation of voltage so that the voltage over a series of cells in a group does not exceed a predetermined maximum. Lids on standard and break compartments cover electrically connected posts, shielding an operator from inadvertent contact. A bus bar module can be configured for coupling to any size of battery cell array, and can be configured for coupling with one or more arrays.

The invention claimed is:
1. A system, comprising:
a bus bar module comprising a row of standard compartments in which a break compartment is positioned adjacent and between two of said standard compartments in said row;
an array of electrochemical cells, received at, and coupled to, said bus bar module;
wherein each said standard compartment is configured with an integrated bus bar configured to electrically couple electrochemical cell posts received therein;
wherein said break compartment is configured to receive a stand-alone non-integrated bus bar, insertable at said break compartment by an operator to couple electrochemical cell posts received at said break compartment;
wherein said bus bar module is configured for electrical connection of said electrochemical cell posts received at said standard compartments prior to electrical connection of said electrochemical cell posts received at said break compartment.

2. The system of claim 1, wherein said bus bar module is configured to prevent operator exposure to a voltage greater than a predetermined maximum by predetermined positioning of said break compartment within said row between said standard compartments.

3. The system of claim 2, wherein said predetermined maximum is 50V.

4. The system of claim 1, wherein a voltage over a group of said standard compartments in said row having said electrochemical cell posts received and coupled therein does not exceed a predetermined maximum.

5. The system of claim 4, wherein said non-integrated bus bar is configured for provision to said break compartment by said operator to connect a first said group of standard compartments to a second said group of standard compartments to provide a a voltage greater than said predetermined maximum, wherein said electrochemical cell posts received within said first group of said standard compartments are interconnected, and said electrochemical cell posts received within said second group of said standard compartments are interconnected prior to connection of said first and second groups of standard compartments by said non-integrated bus bar.

6. The system of claim 1, wherein when lids of all said standard compartments are closed to cover said posts received therein, said posts at said break compartment remain exposed, and a voltage between said exposed posts at said break compartment does not exceed a predetermined maximum.

7. The system of claim 1, wherein said bus bar module is configured for disconnection of said electrochemical cell posts received at said break compartment by removal of said non-integrated bus bar prior to disconnection of said electrochemical cell posts received at said standard compartments.

8. An apparatus, comprising:
a row of standard compartments in which a break compartment is positioned adjacent and between two of said standard compartments in said row;
wherein each said standard compartment is configured with an integrated bus bar configured to couple electrochemical cell posts received therein;
wherein said break compartment is configured to receive a stand-alone non-integrated break bus bar insertable by an operator to couple electrochemical cell posts received at said break compartment;
wherein said apparatus is configured for electrical connection of said electrochemical cell posts received at said standard compartments prior to electrical connection of said said electrochemical cell posts received at said break compartment.

9. The apparatus of claim 8,
wherein a first voltage existing across said electrochemical cell posts coupled by said integrated bus bars at a first set of standard compartments is coupled to a second voltage existing across said electrochemical cell posts coupled by integrated bus bars at a second set of standard compartments when said non-integrated bus bar is received at said break compartment positioned adjacent and between said first and second sets of standard compartments.

10. The apparatus of claim 8, wherein said apparatus is configured, by arrangement of said standard compartments and said break compartment, to protect an operator from exposure to a voltage greater than a predetermined maximum when said apparatus is coupled to a plurality of electrochemical cells.

11. The apparatus of claim 8, wherein each said standard compartments is configured with an attached lid hingedly moveable from an open to a closed position to cover cell posts connected by said integrated bus bar at said standard compartment.

12. The apparatus of claim 8, wherein said apparatus is configured for disconnection of said electrochemical cell posts received at said break compartment by removal of said non-integrated bus bar prior to disconnection of said electrochemical cell posts at said standard compartments.

13. A method for coupling an array of electrochemical cells by group, comprising:
   connecting electrochemical cell posts received at a first group of adjacent standard compartments in a row of a bus bar module;
   connecting electrochemical cell posts received at a second group of adjacent standard compartments in said row of said bus bar module; wherein a first voltage over said electrochemical cell posts connected at said first group of standard compartments, and a second voltage over said electrochemical cell posts connected at said second group of standard compartments do not exceed a predetermined maximum;
   wherein said first group of standard compartments and second group of standard compartments are each configured with an integrated bus bar, respectively, for coupling electrochemical cell posts received therein; and
   electrically connecting said first group of said standard compartments to said second group of said standard compartments to form a series of interconnected electrochemical cells by providing a non-integrated bus bar to a break compartment positioned between and adjacent said first and second group of standard compartments to couple electrochemical cell posts received therein after connecting said first group of said standard compartments to said second group of standard compartments.

14. The method of claim 13, further comprising covering said connection of said first and second groups of said standard compartments by lowering an attached lid at said break compartment.

15. The method of claim 13, wherein said series of interconnected cells provides a voltage greater than said predetermined maximum.

16. The method of claim 13, further comprising connecting said series of interconnected cells with one or more additional said series of interconnected cells.

17. A method, comprising:
   providing a bus bar module to an array of electrochemical cells, said bus bar module comprising a a row of standard compartments in which a break compartment is positioned adjacent and between two said standard compartments, each said standard compartment having an integrated bus bar configured to electrically couple electrochemical posts received therein, and said break compartment configured to receive a stand-alone non-integrated break bus bar insertable by an operator;
   coupling said electrochemical posts received at all said standard compartments of said row to said bus bar module;
   closing said standard compartments; and
   providing said non-integrated break bus bar to said break compartment, after coupling said electrochemical posts received at all said standard compartments of said row to said bus bar module, and after closing said standard compartments.

18. The method of claim 17, further comprising closing said break compartment.

19. The method of claim 18, wherein said closing said break compartment comprises lowering a lid attached to said break compartment to cover cell posts connected by said break bus bar.

20. The method of claim 17, wherein closing said standard compartments comprises lowering a lid attached at said standard compartment to cover cell posts connected by said integrated bus bar at said standard compartment.

\* \* \* \* \*